(12) United States Patent
Shizuka et al.

(10) Patent No.: US 12,217,043 B2
(45) Date of Patent: Feb. 4, 2025

(54) SOFTWARE UPDATING DEVICE, SOFTWARE UPDATING METHOD, AND SOFTWARE UPDATING PROGRAM

(71) Applicant: Nissan Motor Co., Ltd., Yokohama (JP)

(72) Inventors: Yoshimori Shizuka, Kanagawa (JP); Eisuke Ohashi, Kanagawa (JP); Masayuki Motegi, Kanagawa (JP); Hidetoshi Hayashi, Kanagawa (JP); Mitsuhiko Kikuchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 179 days.

(21) Appl. No.: 17/911,669

(22) PCT Filed: Mar. 18, 2020

(86) PCT No.: PCT/IB2020/000333
§ 371 (c)(1),
(2) Date: Sep. 15, 2022

(87) PCT Pub. No.: WO2021/186204
PCT Pub. Date: Sep. 23, 2021

(65) Prior Publication Data
US 2023/0138510 A1    May 4, 2023

(51) Int. Cl.
*B60L 58/13*    (2019.01)
*B60L 53/22*    (2019.01)
(Continued)

(52) U.S. Cl.
CPC ............. *G06F 8/65* (2013.01); *B60R 16/033* (2013.01); *B60L 50/61* (2019.02)

(58) Field of Classification Search
CPC ... G06F 8/65; G06F 8/71; G06F 8/654; G06F 8/64; G06F 11/3055; G06F 11/302;
(Continued)

(56) References Cited

U.S. PATENT DOCUMENTS 7,946,542 B1 *   5/2011   Chapman ............... F16M 13/02
                                                         248/161
8,344,687 B2 *   1/2013   Nishikawa ............ H01M 10/42
                                                         320/132
(Continued)

FOREIGN PATENT DOCUMENTS

CN       109733245 A    5/2019
EP       2 586 662 A1   5/2013
(Continued)

OTHER PUBLICATIONS

European Office Action of Feb. 14, 2024 of corresponding European Patent Application No. 20925635.3.

*Primary Examiner* — Thuy Dao
(74) *Attorney, Agent, or Firm* — Global IP Counselors, LLP

(57) ABSTRACT

A software updating device is provided executes a process for updating software that operate a vehicle-mounted equipment. The software updating device includes a controller and a chargeable onboard battery. The controller acquires the software and applies the software to control the equipment. The chargeable onboard battery supplies electric power to the controller. The controller executes the software update process using the electric power supplied from the onboard battery, when the onboard battery is not being charged. When the controller executes the software update process using the electric power supplied from the onboard battery, the controller prohibits charging of the onboard battery when the onboard battery is not being charged.

8 Claims, 2 Drawing Sheets

(51) Int. Cl.
    *B60R 16/023*     (2006.01)
    *B60R 16/033*     (2006.01)
    *G06F 8/65*     (2018.01)
    *G06F 9/455*     (2018.01)
    *H04L 67/12*     (2022.01)
    *B60L 50/61*     (2019.01)

(58) Field of Classification Search
    CPC .... G06F 8/656; G06F 21/445; G06F 21/6218; G06F 21/572; B60R 16/033; B60R 16/023; B60L 50/61; B60L 58/13; B60L 58/12; B60L 53/62; H01M 10/42; H01M 10/48; H02J 7/02; H04L 63/068; H04L 9/085; H04L 63/062
    See application file for complete search history.

(56) References Cited

U.S. PATENT DOCUMENTS

| | | | | |
|---|---|---|---|---|
| 2003/0230441 | A1* | 12/2003 | Teraji | B60W 10/06 180/65.23 |
| 2005/0097544 | A1* | 5/2005 | Kim | G06F 8/65 717/173 |
| 2010/0213891 | A1* | 8/2010 | Nishikawa | H01M 10/42 320/106 |
| 2010/0270968 | A1* | 10/2010 | Reese | H02J 7/0069 320/103 |
| 2012/0274276 | A1 | 11/2012 | Endo | |
| 2014/0304700 | A1* | 10/2014 | Kim | G06F 8/65 717/173 |
| 2015/0358329 | A1* | 12/2015 | Noda | G06F 21/57 726/4 |
| 2020/0238847 | A1* | 7/2020 | Wiseman | B60L 53/67 |
| 2022/0415097 | A1* | 12/2022 | Kodama | G06F 13/00 |

FOREIGN PATENT DOCUMENTS

| | | |
|---|---|---|
| JP | 2002-147281 A | 5/2002 |
| JP | 2013-84143 A | 5/2013 |
| JP | 2017-27549 A | 2/2017 |
| JP | 2018-20718 A | 2/2018 |
| JP | 2020-27629 A | 2/2020 |

* cited by examiner

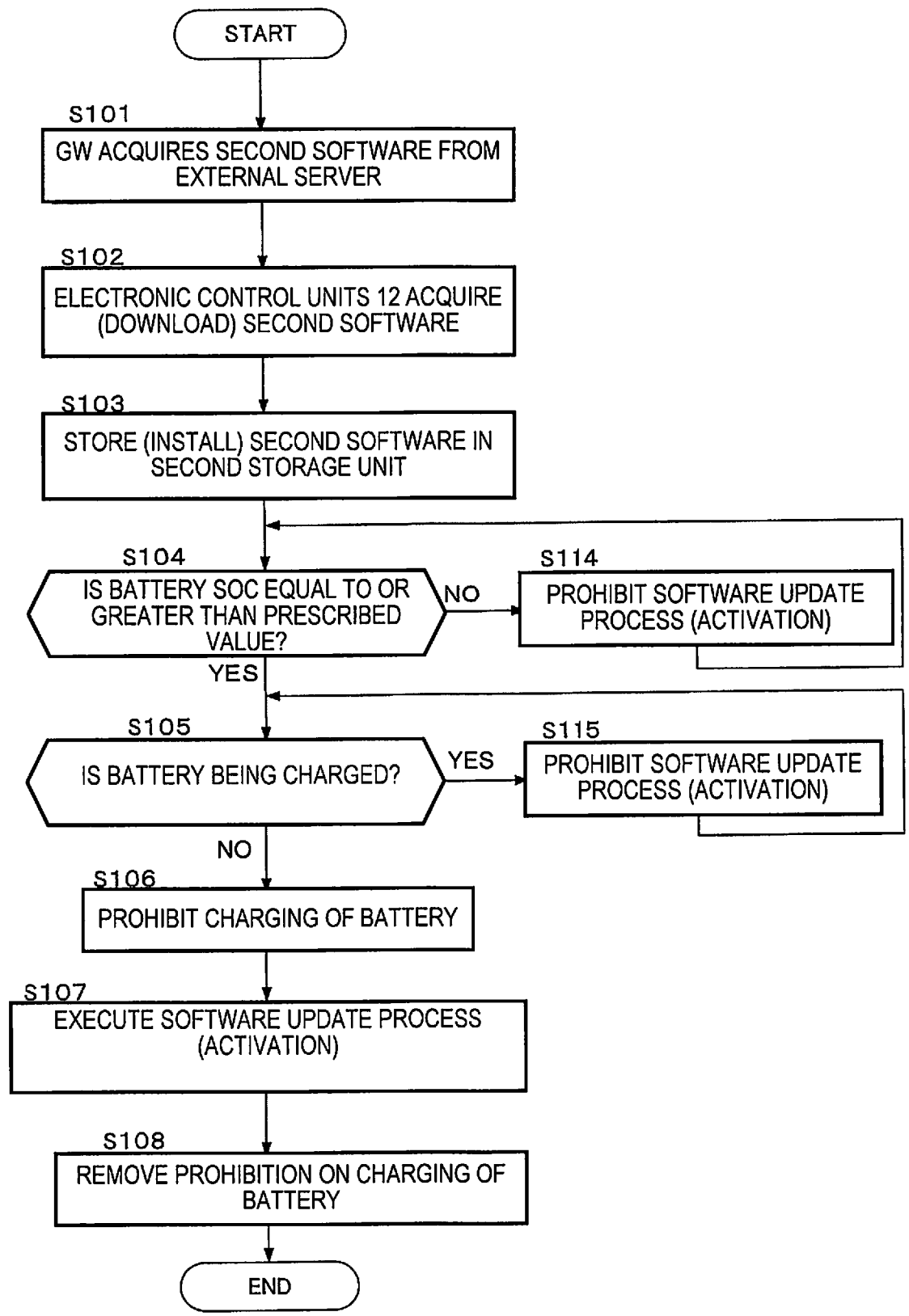

SOFTWARE UPDATING DEVICE, SOFTWARE UPDATING METHOD, AND SOFTWARE UPDATING PROGRAM

CROSS-REFERENCE TO RELATED APPLICATIONS

This application is a U.S. national stage application of International Application No. PCT/IB2020/000333, filed on Mar. 18, 2020.

BACKGROUND

Technical Field

The present invention relates to a software updating device, a software update method, and a software update program.

Background Information

JP 2017-027549 A discloses a software updating device that updates software of onboard equipment by using an update program received through wireless communication. In this software updating device, electric power is supplied from an onboard battery to the onboard equipment that is to be updated, and an update process is performed.

SUMMARY

However, when an onboard battery is being charged by an external power supply, internal combustion engine, etc., a voltage for charging the battery is higher than a voltage used when software of electronic control units (ECUs) that control onboard equipment is updated. Therefore, if the software is updated through supply of electric power from the onboard battery while the onboard battery is being charged, there is a risk that the high charge voltage might be applied to the ECUs, which might adversely affect the ECUs.

The present invention was contrived in view of the above-mentioned problems, it being an object of the present invention to provide a software updating device, a software update method, and a software update program with which software in ECUs can be updated without adversely affecting the ECUs.

According to one aspect of the present invention, there is provided a software updating device that executes a process for updating software by which vehicle-mounted equipment is operated. The software updating device is provided with: a controller that acquires the software and applies the aforementioned software to the equipment, thereby controlling the equipment; and a chargeable onboard battery that supplies electric power to the controller. The controller executes the software update process, using the electric power supplied from the onboard battery, when the onboard battery is not being charged.

BRIEF DESCRIPTION OF THE DRAWINGS

Referring now to the attached drawings which form a part of this original disclosure.

FIG. 2 is a flowchart illustrating software update control according to the one embodiment of the present invention.

DETAILED DESCRIPTION OF EMBODIMENTS

Figure 1:
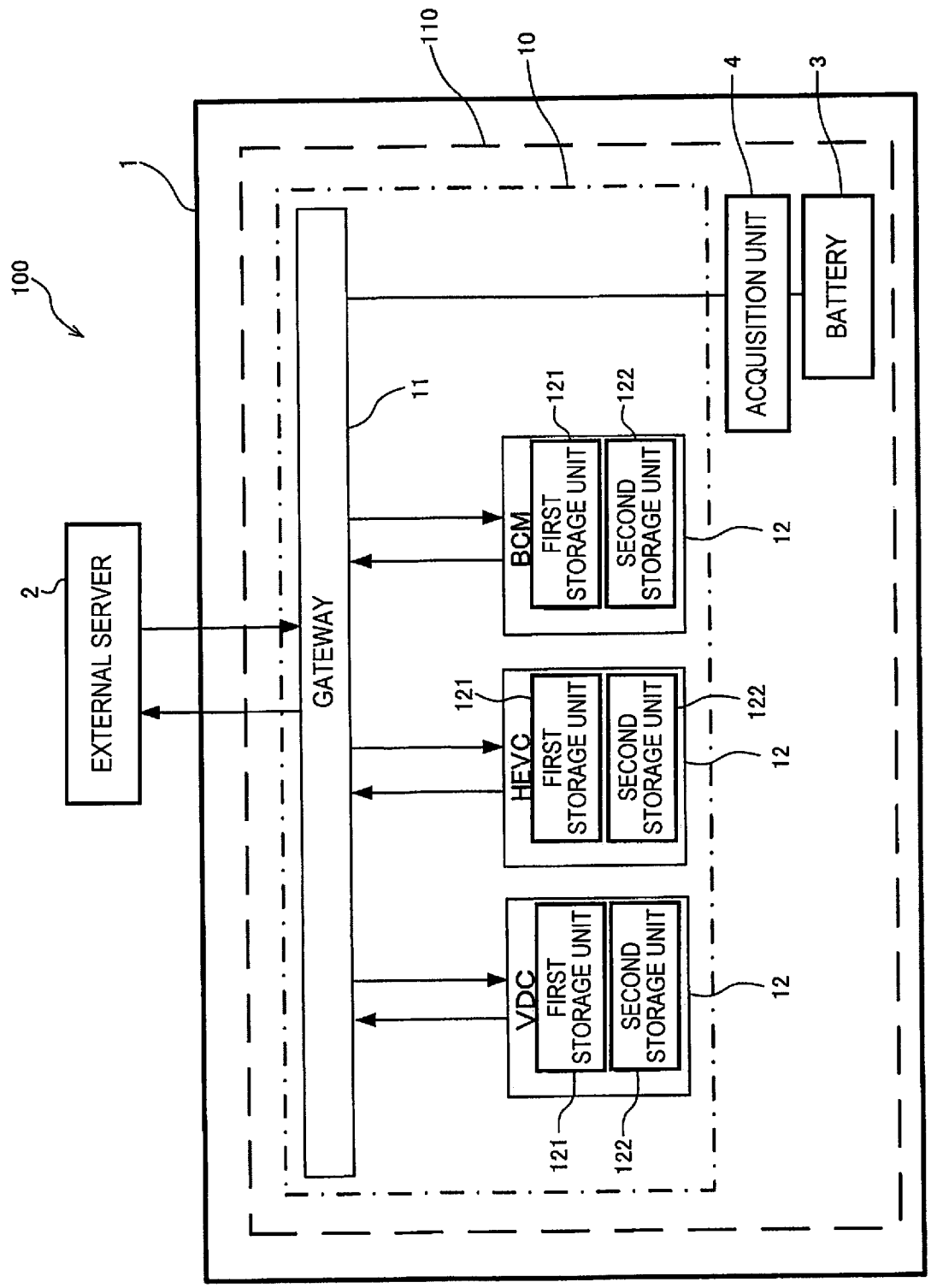
FIG. 1 is a schematic block diagram of a software update system according to one embodiment of the present invention.

An embodiment of the present invention is described below with reference to the accompanying drawings, etc.

One embodiment of the present invention is described with reference to FIGS. 1 and 2. FIG. 1 is a schematic block diagram of a software update system 100 and a software updating device 110 according to this embodiment of the present invention.

As shown in FIG. 1, the software update system 100 is configured from a software updating device 110 mounted in a vehicle 1, and an external server 2. The software updating device 110 is configured from a controller 10, a battery (onboard battery) 3, and an acquisition unit 4. The vehicle 1 is, e.g., an electric vehicle (EV).

The controller 10 includes a gateway 11 that acquires software from the external server 2, and electronic control units (ECUs) 12 that control various pieces of equipment mounted in the vehicle 1.

The gateway 11 is capable of communicating with the external server 2 and the ECUs 12. The gateway 11 acquires updating software from the external server 2 and transmits the aforementioned acquired updating software to ECUs 12 that are to be updated. Additionally, the gateway 11 also acquires control information for the various pieces of equipment from the ECUs 12 and acquires the state of an amount of charge (SOC) in the battery 3 from the acquisition unit 4, which shall be described later.

The gateway 11 is configured from a computer provided with a central processing device (CPU), a read-only memory (ROM), a random access memory (RAM), and an input/output interface (I/O interface), the gateway 11 integrally controlling the software updating device 110. By executing a specific program, the gateway 11 executes a process for controlling the software updating device 110. Together with, e.g., the ECUs 12, the gateway 11 performs software update control that shall be described later.

The ECUs 12 are controllers that control the various pieces of equipment mounted in the vehicle 1, and include, e.g., a body control module (BCM), a vehicle dynamics control (VDC), and a hybrid electric vehicle control (HEVC). The various ECUs 12 are each configured from a computer provided with a central processing device (CPU), a read-only memory (ROM), a random access memory (RAM), and an input/output interface (I/O interface). The BCM controls operating elements in a body of the vehicle 1, including an engine starter, a door lock, etc., of the vehicle 1. The VDC controls output of brakes or an engine of the vehicle 1 and controls an orientation of the vehicle 1, thereby preventing, inter alia, lateral sliding of the vehicle 1. When the vehicle 1 is a hybrid vehicle, the HEVC controls the engine and a motor, which are drive sources, and realizes high-efficiency driving.

The ECUs 12 are capable of communicating with the gateway 11 and continuously transmit control information for the various pieces of equipment to the gateway 11 in the form of signals. The various ECUs 12 acquire software including the specific program from the gateway 11 and apply the acquired software to the equipment being controlled, thereby controlling the equipment. The ECUs 12 also perform, together with the gateway 11, the software update control that shall be described later.

The various ECUs 12 are also each provided with two storage units 121, 122 that store the software acquired from the gateway 11. The ECUs 12 apply the software stored in one storage unit (first storage unit) 121 to the equipment, and change the software being applied to the equipment to the software stored in the other storage unit (second storage unit) 122, thereby updating the software. Further details about a software update process shall be described later.

The battery 3 is connected to the gateway 11 and the ECUs 12. The battery 3 is a power supply that supplies electric power to the gateway 11 and the ECUs 12, and can be charged by being connected to an external power supply. The battery can also be charged by, inter alia, an internal combustion engine (not shown) of the vehicle 1.

The acquisition unit 4 is, inter alia, a sensor that detects (acquires) the amount of charge (SOC) in the battery 3. The SOC of the battery 3 as detected by the acquisition unit 4 is transmitted to the gateway 11 as a signal.

The software update process is described next.

As described previously, the various ECUs 12 are each provided with two storage units 121, 122. When the ECUs 12 acquire software (first software) that is transmitted from the gateway 11, the aforementioned software is stored in one storage unit (first storage unit) 121, and the ECUs 12 apply the aforementioned software to the equipment. The first software can also be already stored in the first storage unit 121 in an initial state rather than being acquired from the gateway 11.

When the ECUs 12 then acquire updating software (second software) that is transmitted from the gateway 11, the aforementioned updating software is stored in the other storage unit (second storage unit) 122. The first software is still applied to the equipment while the ECUs 12 are acquiring and storing the second software.

Thus, providing two storage units 121, 122 to each of the various ECUs 12 makes it possible for the ECUs 12 to acquire (download) and store (install) the updating software in a state in which the first software is applied to the equipment. Specifically, it is possible to acquire and store the updating software without stopping operation of the equipment being controlled.

Upon acquiring and storing the updating software (second software), the ECUs 12 change the software applied to the equipment from the first software to the second software. The software applied to the equipment is thereby updated. The process for changing the software applied to the equipment from the first software to the second software is referred to below as a software update process (activation).

When the battery 3 is being charged, a voltage for charging the battery 3 is higher than a voltage used during the process for updating the software of the ECUs 12. Therefore, if the software update process is executed through supply of electric power from the battery 3 while the battery 3 is being charged, there is a risk that the high charge voltage might be applied to the ECUs 12 such as the ECU, which might adversely affect the ECUs 12. In particular, a capacity of the battery 3 when the vehicle 1 is an electric vehicle is normally greater than with non-electric vehicles, and the charge voltage is also higher. Therefore, if the software update process is executed in a state in which a high-capacity external power supply is linked in order to charge the battery 3, persons inside or near the vehicle 1 might be exposed to danger. In the present embodiment, the software update process is executed using electric power supplied from the battery 3 when the battery 3 is not being charged.

Specifically, the gateway 11 executes the software update process when the battery 3 of the vehicle 1 is not being charged, and prohibits charging of the battery 3 while the software update process is in progress.

Thus, because the software update process is executed when the battery 3 of the vehicle 1 is not being charged, it is possible to prevent the high charge voltage from being applied to the ECUs 12 during activation. Specifically, it is possible to execute the software update process without adversely affecting the ECUs.

Additionally, because the electric power used in the software update process is much lower than the electric power used when other equipment is being actuated, there is substantially no risk of battery death even if the battery 3 is not charged while the software update process is being executed. In particular, because the capacity of the battery 3 when the vehicle 1 is an electric vehicle is normally greater than with non-electric vehicles, there is very little risk of battery death caused by the software update process.

In a case in which, for example, the SOC of the battery 3 will reach a value very close to zero when the software update process is executed, the gateway 11 prohibits the software update process. Because there is a risk of battery death caused by execution of the software update process in a case in which the SOC is very close to zero, it is necessary to charge the battery 3 before performing the software update process. Therefore, the gateway 11 prohibits the software update process and informs the driver that it is necessary to charge the battery 3, the notification being issued using, e.g., a display device.

FIG. 2 is a flowchart illustrating software update control according to the one embodiment of the present invention. The control described below is, in either instance, executed by the controller 10 (gateway 11 and ECUs 12). The first software is stored in the first storage units 121 of the ECUs 12 in an initial state, and is applied to the equipment being controlled.

In step S101, upon acquiring the updating software (second software) from the external server 2, the gateway (GW) 11 transmits the aforementioned updating software to the ECUs 12 that are to be updated.

In step S102, the ECUs 12 acquire (download) the updating software (second software) from the gateway 11.

Next, in step S103, the ECUs 12 store (install) the updating software (second software) in the second storage unit 122. Because the first software is still applied to the equipment being controlled by the ECUs 12 while the second software is being acquired and stored in steps S102 and S103, the equipment being controlled by the ECUs 12 is not stopped.

In step S104, the gateway 11 acquires the value of the SOC of the battery 3 as detected by the acquisition unit 4 and assesses whether or not the SOC of the battery 3 is equal to or greater than a prescribed value (threshold value). The prescribed value referred to above is such that, for example, the SOC of the battery 3 will reach a value very close to zero when the software update process is executed. When the SOC of the battery 3 is equal to or greater than the prescribed value (threshold value), the gateway 11 executes the process in step S105. However, when the SOC of the battery 3 is less than the prescribed value, the gateway 11 executes the process in step S114.

When the SOC of the battery 3 is less than the prescribed value, the gateway 11, in step S114, prohibits the software update process. The gateway 11 preferably informs the driver that it is necessary to charge the battery 3, the notification being issued using, e.g., the display device. Upon prohibiting the software update process, the process flow returns to step S104. Once the battery 3 is charged and the SOC of the battery 3 becomes equal to or greater than the prescribed value, the gateway 11 executes the process in step S105.

When the SOC of the battery 3 is equal to or greater than the prescribed value in step S104, the gateway 11, in step S105, assesses whether the battery 3 is being charged. The assessment of whether the battery 3 is being charged is made on the basis of, e.g., the control information for the various pieces of equipment acquired from the ECUs 12 and the SOC of the battery 3 as detected by the acquisition unit 4. When the battery 3 is not being charged, the gateway 11 executes the process in step S106. However, when the battery 3 is being charged, the gateway 11 executes the process in step S115.

When the battery 3 is being charged, the gateway 11, in step S115, prohibits the software update process, and the process flow returns to step S105. Once charging of the battery 3 is stopped, the gateway 11 executes the process in step S106.

When the battery 3 is not being charged in step S105, the gateway 11, in step S106, prohibits charging of the battery 3.

In step S107, the gateway 11 supplies the electric power necessary for the software update process from the battery 3 to the ECUs 12, and the ECUs 12 execute the software update process using the electric power supplied from the battery 3. Specifically, the ECUs 12 change the software applied to the equipment being controlled from the first software to the second software. The software applied to the equipment is thereby updated from the first software to the second software. During the software update process, it is preferable for the driver to be notified via the display device, etc., that the update process is in progress.

When the software update has concluded, the gateway 11, in step S108, removes the prohibition on charging of the battery 3 and terminates the software update process.

Thus, because the software update process is executed using the electric power supplied from the battery 3 when the battery 3 is not being charged, it is possible to prevent the high charge voltage from being applied to the ECUs 12 during the update process. Additionally, because charging of the battery 3 is prohibited before the software update process, it is possible to more reliably prevent the high charge voltage from being applied to the ECUs 12 during the update process.

Because each of the ECUs 12 has two storage units 121, 122, it is possible to acquire and store the updating software (second software) in a state in which the first software stored in the first storage unit 121 is applied to the equipment. Therefore, the equipment controlled by the ECUs 12 that are to be updated is not stopped while the updating software is being acquired and stored. Specifically, charging of the battery (onboard battery) 3 is not prohibited while the updating software is being acquired and stored, but rather is prohibited only during the software update process. It is therefore possible to shorten the time during which charging of the battery (onboard battery) 3 is prohibited to a greater extent than in cases in which the equipment controlled by the ECUs 12 that are to be updated is stopped before the updating software is acquired and stored.

It is preferable to prohibit charging of the battery 3 before the software update process in order to more reliably prevent the charge voltage from being applied to the ECUs 12. However, such an arrangement is not necessarily provided by way of limitation. In particular, because acquisition and storage of the updating software are not included in the software update process in the present embodiment, the software update process concludes after a short time. Therefore, it is permissible to purposefully not execute the process for prohibiting charging of the battery 3, provided that the software update process is started when the battery 3 is not being charged. Specifically, the processes in steps S106 and S108 can be omitted.

It is preferable to prohibit the software update process when the SOC is less than the prescribed value in order to reliably prevent battery death caused by the software update process. However, SOC-based prohibition of the software update process is not essential. Normally, the battery 3 is charged before the SOC of the battery 3 reaches zero, and the electric power used in the software update process is much lower than the electric power used when other equipment is being actuated. Therefore, there is substantially no risk of battery death caused by the software update process even if the process of SOC-based prohibition of the software update process is omitted. Specifically, the processes in steps S104 and S114 can be omitted.

After the software update process has concluded, when the software is furthermore updated in a subsequent instance, updating software that is transmitted from the gateway 11 to the ECUs 12 is stored (written over) in the first storage unit 121. The software applied to the equipment is changed from the second software stored in the second storage unit 122 to the aforementioned updating software that is stored in the first storage unit 121, whereby re-updating of the software is executed.

The processes shown in FIG. 2 are configured as programs that are to be executed by the controller 10, which is a computer. These programs are written in a storage medium.

By using the software updating device 110 according to the embodiment described above, it is possible to obtain the following effects.

In the software updating device 110, the ECUs 12 (controller 10) execute the software update process, using electric power supplied from the battery (onboard battery) 3, when the battery (onboard battery) 3 is not being charged. Because the software update process is executed when the battery (onboard battery) 3 is not being charged, it is possible to prevent the high charge voltage from being applied to the ECUs 12 during activation. Specifically, it is possible to execute the software update process without adversely affecting the ECUs.

In the software updating device 110, the software update process is executed using electric power supplied from the battery (onboard battery) 3 when the battery (onboard battery) 3 is not being charged by the external power supply. If the software update process is executed in a state in which the external power supply is linked in order to charge the battery 3, persons inside or near the vehicle 1 might be exposed to danger. However, in the software updating device 110 according to the present embodiment, because the software update process is executed when the battery 3 is not being charged by the external power supply, it is possible to prevent persons inside or near the vehicle 1 from being exposed to danger.

In the software updating device 110, the software update process is executed using electric power supplied from the battery (onboard battery) 3 when the battery (onboard battery) 3 is not being charged by the internal combustion engine of the vehicle 1. Because the software update process is executed when the the battery (onboard battery) 3 is not being charged by the internal combustion engine, it is possible to prevent the high charge voltage from being applied to the ECUs 12 during activation. Specifically, it is possible to execute the software update process without adversely affecting the ECUs.

In the software updating device 110, charging of the battery (onboard battery) 3 is prohibited before the software update process is executed. Therefore, it is possible to more reliably prevent the high charge voltage from being applied to the ECUs 12 during the software update process.

The ECUs 12 (controller 10) has the first storage unit 121 that stores the first software, and the second storage unit 122 that stores the second software. It is therefore possible to acquire the updating software (second software) and to store the updating software in the second storage unit 122 in a state in which the first software stored in the first storage unit 121 is applied to the equipment. Therefore, the equipment controlled by the ECUs 12 that are to be updated is not stopped while the updating software is being acquired and stored. Specifically, charging of the battery (onboard battery) 3 is not prohibited while the updating software is being acquired and stored, but rather is prohibited only during the software update process. It is therefore possible to shorten the time during which charging of the battery (onboard battery) 3 is prohibited to a greater extent than in cases in which the equipment controlled by the ECUs 12 that are to be updated is stopped before the updating software is acquired and stored, and convenience during software update work is improved.

In the software updating device 110, the gateway 11 (controller 10) prohibits the software update process when the amount of charge (SOC) in the battery (onboard battery) 3 as acquired by the acquisition unit 4 is less than the prescribed value. This makes it possible to reliably prevent the SOC in the battery 3 from being insufficient and to prevent the battery 3 from dying due to execution of the software update process.

In the present embodiment, a BCM, a VDC, and an HEVC are employed as the ECUs 12, but the types of ECUs 12 and the quantity thereof are not limited to those in the present embodiment, provided that the ECUs 12 control equipment mounted in the vehicle 1.

The software update control including the software update process according to the present embodiment can be executed simultaneously in any number of the plurality of ECUs 12, or can be executed at different times for each of the various ECUs 12.

In the present embodiment, a configuration was employed in which the gateway 11 integrally controls the software updating device 110 and the ECUs 12 control the various pieces of equipment mounted in the vehicle 1. However, the elements executing the various controls can be either of the gateway 11 and the ECUs 12. For example, the changing of the software applied to the equipment (i.e., the software update process) can be executed by the gateway 11 rather than by the ECUs 12.

In the present embodiment, the ECUs 12 are each configured so as to have two storage units 121, 122. However, such an arrangement is not necessarily provided by way of limitation. As described previously, it is preferable for each of the ECUs 12 to have two storage units 121, 122 in order to make it possible to shorten the time during which charging of the battery 3 is prohibited, but the ECUs 12 can also each be configured so as to have only one storage unit. When each of the ECUs 12 has only one storage unit, the updating software is written over the software stored in the aforementioned storage unit, whereby the software update process is performed. Therefore, because the equipment being controlled by the ECUs 12 is stopped also while the updating software is being acquired (downloaded) and stored (installed) by the ECUs 12, the ECUs 12 acquire the updating software while the battery 3 is not being charged. It is also preferable to prohibit charging of the battery 3 while the updating software is being acquired (downloaded) and stored (installed) by the ECUs 12.

An embodiment of the present invention has been described above, but this embodiment merely indicates one example in which the present invention is applied, and is in no way intended to restrict the technical scope of the present invention to the specific configuration of the embodiment.

The invention claimed is:

1. A software updating device comprising:
a controller including a processor and a storage; and
a chargeable onboard battery configured to supply electric power to the controller,
the controller being configured to:
acquire a second software to be used for updating a first software that operates a vehicle-mounted equipment of a vehicle; and
determine whether the chargeable onboard battery is being charged;
upon determining that the chargeable onboard battery is not being charged, execute a software update process that includes using the electric power supplied from the chargeable onboard battery to overwrite the first software with the second software, the controller being configured to prohibit charging of the chargeable onboard battery during the software update process; and
upon determining that the chargeable onboard battery is being charged, prohibit the execution of the software update process.

2. The software updating device according to claim 1, wherein
the chargeable onboard battery is configured to be charged by an external power supply, and
the controller is configured to execute the software update control using the electric power supplied from the chargeable onboard battery when the chargeable onboard battery is not being charged at least by the external power supply.

3. The software updating device according to claim 1, wherein
the chargeable onboard battery is configured to be charged by an internal combustion engine of the vehicle, and
the controller is configured to execute the software update control using the electric power supplied from the chargeable onboard battery when the chargeable onboard battery is not being charged at least by the internal combustion engine.

4. The software updating device according to claim 1, wherein:
the controller includes
a first storage unit that stores the first software, and
a second storage unit that stores the second software;
the software update process includes overwriting the first software stored in the first storage unit with the second software; and
the charging of the chargeable onboard battery is prohibited before the software update process is executed.

5. The software updating device according to claim 1, wherein
the controller is configured to acquire an amount of charge in the chargeable onboard battery, and
the controller being configured to prohibit the software update process when the amount of charge in the chargeable onboard battery is less than a prescribed value.

6. The software updating device according to claim 1, wherein
the software updating device is mounted in an electric vehicle.

7. A software update method for a vehicle that includes a controller, a vehicle-mounted equipment, and a chargeable onboard battery, the software update method comprising:
acquiring a second software to be used for updating a first software that operates the vehicle-mounted equipment;
determining whether the chargeable onboard battery is being charged;
upon determining that the chargeable onboard battery is not being charged, executing a software update that includes using electric power supplied to the controller from the chargeable onboard battery to overwrite the first software with the second software;
prohibiting charging of the chargeable onboard battery during the software update process; and
prohibiting the execution of the software update process upon determining that the chargeable onboard battery is being charged.

8. A computer-readable medium comprising:
a non-transitory tangible medium on which is stored a computer-executable software update program for implementing a software update process for updating a first software that operates a vehicle-mounted equipment of a vehicle,
the software update program being configured to cause a controller to acquire a second software to be used for updating the first software;
determine whether a chargeable onboard battery of the vehicle is being charged;
execute the software update process upon determining that the chargeable onboard battery is not being charged, the software update process including using electric power supplied to the controller from the chargeable onboard battery to overwrite the first software with the second software; and
prohibit charging of the chargeable onboard battery during the software update process; and
prohibit the execution of the software update process upon determining that the chargeable onboard battery is being charged.

* * * * *